Dec. 7, 1943.　　　A. Y. DODGE　　　2,336,231
HYDRAULIC TORQUE TRANSMITTING DEVICE
Filed Feb. 14, 1941　　　3 Sheets-Sheet 1

Inventor:
Adiel Y. Dodge,
By Dawson, Ooms & Booth
Attys

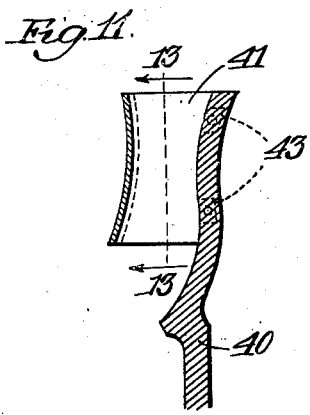
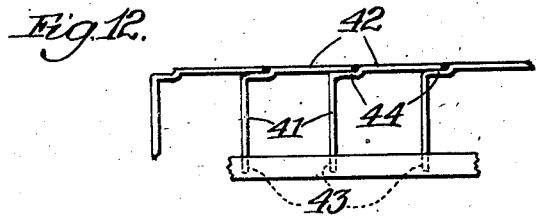
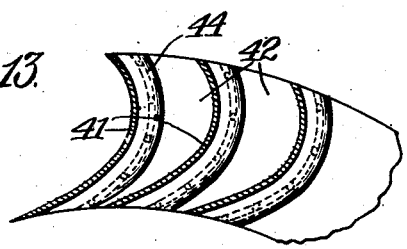
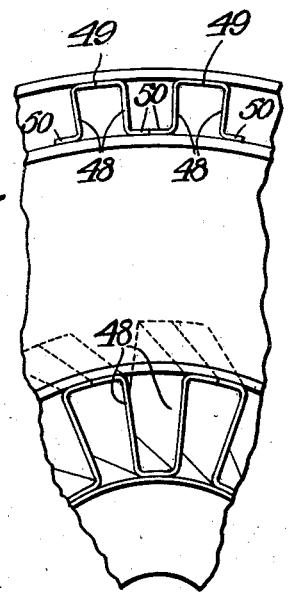
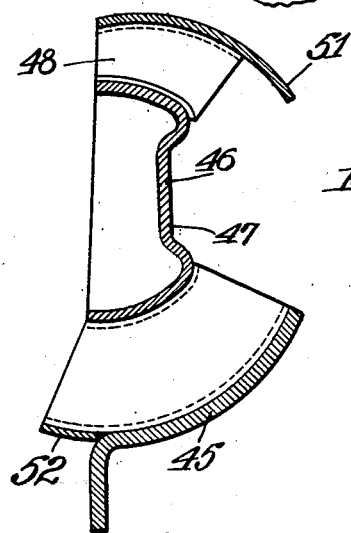
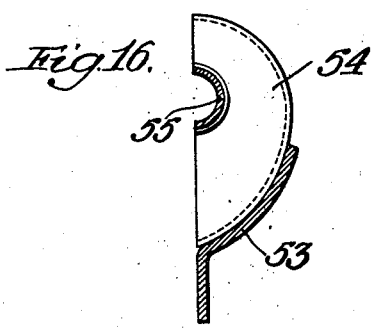
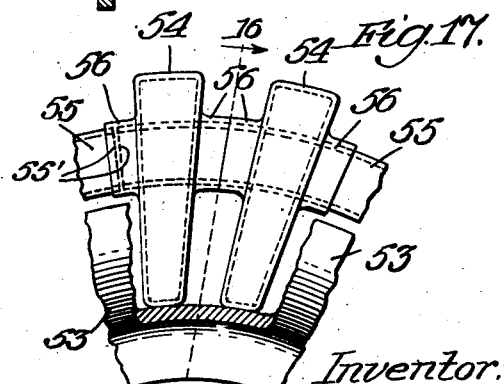

Dec. 7, 1943.    A. Y. DODGE    2,336,231
HYDRAULIC TORQUE TRANSMITTING DEVICE
Filed Feb. 14, 1941    3 Sheets-Sheet 3
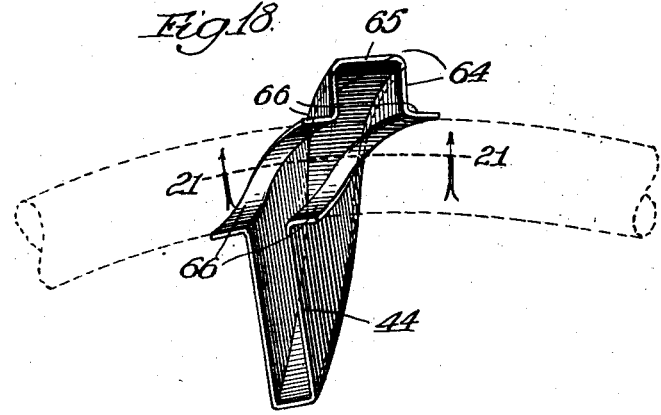
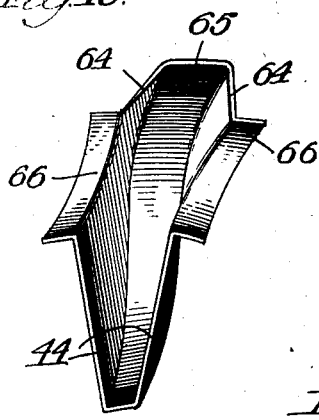
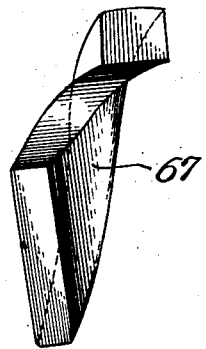
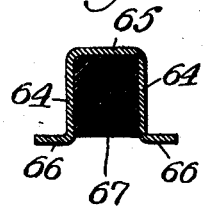
Inventor:
Adiel Y. Dodge,
By Dawson, Ooms & Booth
Attys Patented Dec. 7, 1943

2,336,231

UNITED STATES PATENT OFFICE 2,336,231

HYDRAULIC TORQUE TRANSMITTING DEVICE

Adiel Y. Dodge, Rockford, Ill.

Application February 14, 1941, Serial No. 378,843

4 Claims. (Cl. 103—115)

This invention relates to hydraulic torque-transmitting devices, and more particularly to vaned elements for such devices made from sheet metal.

Hydraulic torque-transmitting devices have heretofore been constructed chiefly either by casting the vanes and various supporting structures integrally or by welding preformed vanes to preformed supporting structures. Both of these operations are tedious and expensive to perform and are very apt to result in warpage of the parts, causing irregularities which may set up undesirable vibrations in the finished unit.

It is one of the objects of the present invention to provide a hydraulic torque-transmitting device in which the vanes and perhaps other supporting parts may be formed from sheet metal and assembled in a rigid unit quickly and easily without danger of warpage.

Still another object of the invention is to provide a hydraulic torque-transmitting device in which the vanes are formed of sheet metal stampings which fit together in the assembly in such a way as to reinforce and brace each other. According to one feature the stamped vanes may have vane portions of any desired contour and flange portions which engage and are secured to adjacent vanes so as to form a rigid assembly providing cell-shaped fluid passages.

A further object of the invention is to provide a hydraulic torque transmitting device in which the vanes are formed of channel section sheet metal stampings provided with flanges which abut to space the vanes properly. With this construction proper spacing is insured but the vanes may be sprung slightly to compensate for inaccuracies in the construction.

The above and other objects, advantages and novel features of the invention will be apparent from the following description when read in connection with the accompanying drawings, in which:

Figure 11 is a partial axial section of another vaned element;

Figure 12 is a plan view looking from the top of Figure 11;

Figure 13 is a section on the line 13—13 of Figure 11;

Figure 14 is an axial section through another vaned element;

Figure 15 is a partial elevation looking from the left in Figure 14;

Figure 16 is an axial section through another vaned element on the line 16—16 of Figure 17;

Figure 17 is a partial elevation of Figure 16 with parts broken away;

Figure 18 is a perspective view of another vaned element;

Figure 19 is a similar view showing the vane at one stage of its manufacture;

Figure 20 is a view of a block used in forming the vane of Figure 18; and

Figure 21 is a sectional view of the vane with the block in place.

Figure 1:
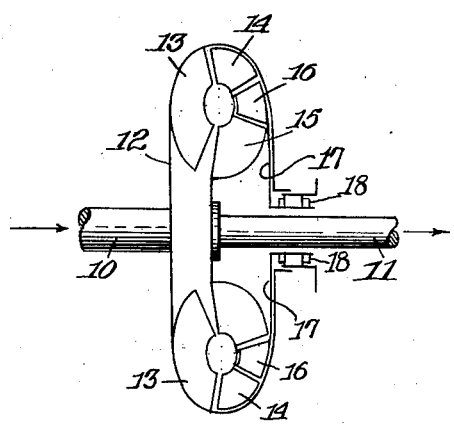
Figure 1 is a diagrammatic sectional view of a hydraulic torque converter embodying the invention.
Figure 2:
Figures 2 to 5 are perspective views of one form of stamped vane member.
Figure 3:
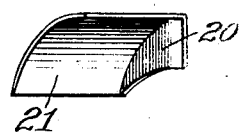
Figure 4:
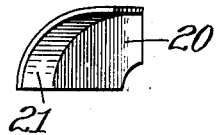
Figure 5:
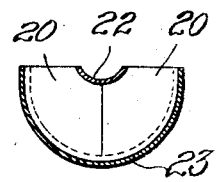

Figure 1 illustrates a hydraulic torque converter having four vaned elements and connecting a driving shaft 10 to a driven shaft 11. A housing 12 is connected to the driving shaft and carries a series of impeller vanes 13. Adjacent the inlet and outlet ends respectively of the impeller vanes are arranged sets of rotor vanes 14 and 15, which are connected to the driven shaft 11. Between the two sets of rotor vanes there is arranged a set of stator vanes 16 carried by a hub member 17, which is mounted on a combined one-way clutch and bearing 18 of the type shown and claimed in my patent, No. 2,113,722. The operation of this device is well understood and will not be explained in detail. It will also be understood that the invention is not limited to torque converters of the particular type shown, but may be applied equally well to hydraulic couplings or to torque converters having more or less than four elements as shown.

Figure 6:
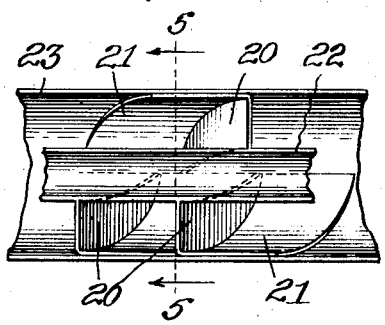
Figure 6 is a developed view showing a vane assembly.

The several vaned elements of the hydraulic device may be formed by stamping from sheet metal, vane members which are assembled on and secured to the several supporting parts to form a complete vaned element. As shown in Figures 2 to 6, such vane members may be formed with vane portions 20 adapted to extend at substantially a right angle from the supporting parts and with flange portions 21 extending at substantially a right angle from the vane portions. The vane portions are shaped to fit around a core member 22 and the flanges are shaped to lie within a shroud or supporting part 23, it being noted that two identical vane members assembled with their flanges extending in opposite directions, as seen in Figure 6, form a substantially semi-circular section. The subject matter of Figures 2 to 6 is fully disclosed in my copending application, Serial No. 723,083, filed April 30, 1934, of which this application is a continuation in part.

In assembling the several parts, the vanes are first stamped out and the core and shroud members are separately formed of sheet metal or the like. The parts are then loosely laid together with soldering or brazing material between them, and may be held in place by a clamp as shown in my copending application, Serial No. 436,087, filed March 25, 1942. The vane members and shroud and core parts are preferably formed of steel, and may suitably be soldered together by copper or brass, strips or particles of which are laid between the contacting portions of the several parts when they are assembled. Instead of using strips or particles, the vanes or cores and shrouds, or all of them, may be plated with copper before assembly.

With the parts assembled on the clamp, the entire assembly may be placed in a hydrogen furnace or a like non-oxidizing atmosphere and the temperature raised to a point above the melting point of the soldering material. The material thus fuses to the adjacent parts, rigidly securing them together, and since the heat is uniformly applied, there is no tendency to cause warping of the vanes, cores or shrouds. The flange portions 21 of the vane members in this way are secured not only to the shroud 23, but also to adjacent vane members so that an extremely rigid unit is provided.

Figure 9:
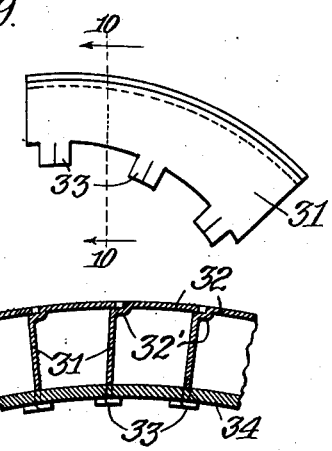
Figure 9 is a side view of another vane construction.
Figure 10:
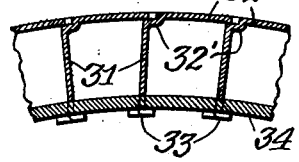
Figure 10 is a section showing an assembly of the vanes of Figure 9.

Figures 9 and 10 illustrate another vane construction including a sheet metal stamping having a vane portion 31 and a flange portion 32 at right angles thereto. The vane portion 31 is formed with a series of split lugs 33, which are adapted to extend through slots in a core member 34. The lugs may then be bent over in opposite directions as shown in Figure 10, and may, if desired, be spot welded or soldered to provide greater strength.

It will be noted that each vane member 31 is formed with a slight offset portion at 32' into which the edge of the adjacent flange projects. In assembling these vanes, strips or wires of solder material may be inserted at these overlapping portions so as to secure them rigidly together when subjected to an increase in temperature, as described above, or the vane may be copper plated before assembling, over their entire surface or on specific contacting surfaces only. The vanes shown in Figures 9 and 10 are particularly advantageous in the forming of rotor vanes such as 14 in Figure 1, it being noted that the flanges 32 form an outer shroud for the vanes so that no separate shroud member is required.

Figure 7:
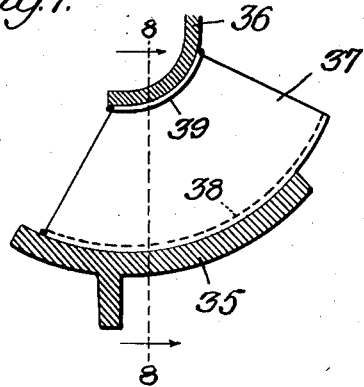
Figure 7 is a partial axial section showing another vane construction.
Figure 8:
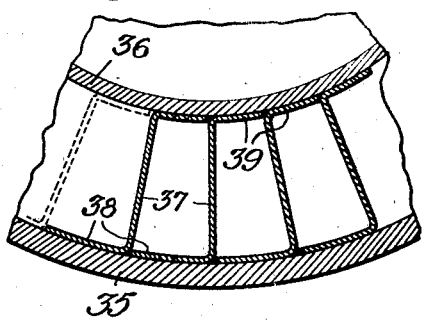
Figure 8 is a section on the line 8—8 of Figure 7.

Figures 7 and 8 illustrate a construction which may advantageously be employed for forming the rotor vanes 15, as shown in Figure 1. In this construction a supporting or hub part 35 is formed with an annular curved surface to receive the vanes at one side, and a core member 36 which may form a continuation of the core 34, engages the vanes on their opposite side. Each vane is formed by a sheet metal stamping having a vane portion 37 extending substantially at right angles to the members 35 and 36, and formed at its ends with flanges 38 and 39 extending in opposite directions. The flanges 38 are formed to fit against the surface of the member 35, while the flanges 39 similarly fit around the core member 36. These vanes and supporting members may be assembled and secured together by soldering or brazing as described above, or may, if desired, be welded along their meeting edges.

Figures 11 to 13 illustrate one manner of forming a stator member such as shown at 16 in Figure 1. In this construction, a hub member 40 of cast metal such as cast steel, supports a series of stamped sheet metal vanes having vaned portions 41 and flange portions 42. The vaned portions 41 are formed with lugs 43 extending into the hub member 40, the hub member preferably being cast around these lugs to anchor them securely. Each vane member is formed with an offset portion 44 to receive the end of the flange 42 of an adjacent vane, the vane members being secured together at this point by brazing or by welding. Figure 13 illustrates a curved formation of the vanes, which may advantageously be employed, it being understood that the vanes in all of the members may be given any desired contour.

Figures 14 and 15 illustrate another construction of the double rotor which is supported on a hub member 45 and which employs a single core member 46 having its ends shaped to engage the inner and outer sides of rotor vanes and with a groove at 47 intermediate its ends to receive the inner edge of the stator vanes. The vanes in this construction are formed by channel-shaped stampings having vane portions 48 connected at their outer edges by a cross-web 49 and with flanges 50 at their inner edges to fit around the core member. The inner and outer vane members are substantially identical except for differences in size and contour, it being understood that the vanes are given the necessary shape to provide the desired flow passage area and contour. The outer vanes are closed by a shroud member 51 overlying their outer surfaces, and the discharge end of the inner vanes may be closed by a small shroud 52 forming in effect a continuation of the surface of the hub member 45. The several elements forming this assembly may be assembled with solder material between them and may then be placed in a hydrogen furnace or the like, to complete the brazing operation so as to form a rigid and permanent assembly.

Figures 16 and 17 illustrate a somewhat similar construction employed in a single rotor such as might be used in a hydraulic coupling. In this construction, a hub member 53 engages the outer surface of a series of sheet metal vane members 54, formed with a channel section in substantially the same manner as the vane members in Figures 14 and 15. An annular core member 55, which may be a relatively small core of substantially semi-circular section fits against the inner surfaces of the vane members and against flanges 56 thereon. It will be noted in this construction that no shroud is employed to close the outer edges of the vanes, except insofar as they are closed by the hub 53 and by the outer sheet of the channel section. This provides a semi-skeleton rotor construction in which alternate passages are opened and closed at the outside. If a completely enclosed rotor is desired, it will be understood that a shroud member such as 51 in Figures 14 and 15 could be added.

Figures 18 to 21 illustrate the formation of a vane member of the same general type as that of Figures 15 to 17, but having a curved contour. The completed vane is shown in Figure 18 and includes a channel-shaped body portion having vane portions 64 joined by an outer web 65, and having flanges 66 at their inner edges to fit around a core member shown in dotted lines. The vane portions 64 are curved from end to end to provide a curved passage for fluid therethrough and are particularly desirable for use in hydraulic torque converters.

The vane members of Figure 18 cannot be formed in a single stamping or pressing operation due to the fact that their curvature would prevent removal from the die. In making these members, therefore, a stamping as shown in Figure 19 is first made in a die, this stamping differing from the finished member in that the sides are bent out as shown at the upper left and lower right of the figure, to provide draft for removal from the die. Thereafter, a block member 67 as shown in Figure 20 is placed in the stamping cavity and the sides are pressed in against the block member. The block member is formed of flexible material such as rubber so that it can be pulled from the completed vane member. In this way the complex shape desired can be obtained in sheet metal by two simple pressing operations.

While several embodiments according to the present invention have been shown and described in detail, it will be understood that these are illustrative only and are not to be taken as a definition of the scope of the invention, reference being had for this purpose to the appended claims.

What is claimed is:

1. In a hydraulic torque transmitting device, a vaned element comprising an annular core and a series of vane members secured to said core, each of said vane members comprising a sheet metal stamping channel-shaped in section and curved longitudinally around the core and having outwardly extending flanges fitting against and secured to the core the flanges being of substantially uniform width throughout the length of each vane member, the vane members being assembled on the core with said flanges in abutting relationship to space the vane members so that the sides of the channel sections will form substantially parallel single thickness vanes.

2. In a hydraulic torque transmitting device, a vaned element comprising an annular core and a series of vane members assembled on the core, each of the vane members comprising a sheet metal stamping channel shaped in cross section and curved longitudinally around the core and having outwardly extending flanges at the edges of its channel section fitting against the core and soldered thereto substantially throughout the area of the flanges the flanges being of substantially uniform width throughout the length of each vane member the edges of the flanges on adjacent vane members abutting to space the vane members around the core so that the sides of the channel sections form substantially parallel single thickness vanes.

3. In a hydraulic torque transmitting device, a vaned element comprising an annular core and a series of vane members assembled on the core, each of the vane members comprising a sheet metal stamping channel shaped in cross section and curved longitudinally around the core and having outwardly extending flanges at the edges of its channel section fitting against the core and soldered thereto substantially throughout the area of the flanges the flanges being of substantially uniform width throughout the length of each vane member the edges of the flanges on adjacent vane members abutting to space the vane members around the core so that the sides of the channel sections form substantially parallel single thickness vanes, and an annular supporting member overlying the vane members and soldered to the base portions of said channel sections substantially throughout the area thereof.

4. In a hydraulic torque transmitting device a vaned element comprising an annular metallic core and a series of vaned members assembled on the core, each of the vaned members comprising a sheet metal stamping channel-shaped in section with the sides of the channels projecting from the core at substantially a right angle and with their length transversely of the core, the sides of the channels being formed with outwardly extending flanges at the open side of the channel lying against and soldered to the core throughout substantially the entire flange area the flanges being of substantially uniform width throughout the length of each vane member, the edges of the flanges on adjacent vane members abutting to space the vane members around the core so that the sides of the channel sections form substantially parallel single thickness vanes.

ADIEL Y. DODGE.